United States Patent
Weng et al.

(10) Patent No.: US 8,866,441 B2
(45) Date of Patent: Oct. 21, 2014

(54) INTERLOCK MECHANISM FOR A MULTIPLE BATTERY PACK

(75) Inventors: Sam Weng, Cupertino, CA (US); Gabriel Risk, San Francisco, CA (US)

(73) Assignee: ATIEVA, Inc., Redwood City, CA (US)

( * ) Notice: Subject to any disclaimer, the term of this patent is extended or adjusted under 35 U.S.C. 154(b) by 715 days.

(21) Appl. No.: 12/943,849

(22) Filed: Nov. 10, 2010

(65) Prior Publication Data

US 2011/0111268 A1    May 12, 2011

Related U.S. Application Data

(60) Provisional application No. 61/260,393, filed on Nov. 11, 2009.

(51) Int. Cl.
 *H01M 10/44* (2006.01)
 *H02J 7/34* (2006.01)
 *H02J 7/00* (2006.01)

(52) U.S. Cl.
 CPC .............. *H01M 10/441* (2013.01); *Y02E 60/12* (2013.01)
 USPC ............... 320/122; 307/46; 307/66; 324/418; 324/422

(58) Field of Classification Search
 USPC ......................................................... 320/122
 See application file for complete search history.

(56) References Cited

U.S. PATENT DOCUMENTS

| | | | |
|---|---|---|---|
| 5,784,626 A * | 7/1998 | Odaohara | 713/300 |
| 6,365,297 B1 | 4/2002 | Wolczak et al. | |
| 6,741,065 B1 | 5/2004 | Ishii et al. | |
| 6,882,129 B2 | 4/2005 | Boskovitch et al. | |
| 7,501,720 B2 * | 3/2009 | Popescu-Stanesti et al. | ... 307/66 |
| 7,944,662 B2 * | 5/2011 | Carkner et al. | 361/90 |
| 8,143,855 B2 * | 3/2012 | Davis | 320/126 |
| 8,212,412 B1 * | 7/2012 | Benedict et al. | 307/87 |
| 8,344,555 B2 * | 1/2013 | Ichikawa et al. | 307/115 |
| 2001/0028171 A1 | 10/2001 | Omata et al. | |
| 2002/0070608 A1 * | 6/2002 | Matsuki et al. | 307/9.1 |
| 2004/0085071 A1 * | 5/2004 | Sankey | 324/418 |
| 2004/0155627 A1 * | 8/2004 | Stanesti et al. | 320/127 |
| 2006/0267551 A1 * | 11/2006 | Sutardja | 320/116 |
| 2007/0247106 A1 | 10/2007 | Kawahara et al. | |
| 2007/0262746 A1 | 11/2007 | Kang et al. | |
| 2008/0246340 A1 * | 10/2008 | Swisher | 307/66 |
| 2009/0078481 A1 | 3/2009 | Harris | |
| 2010/0296204 A1 | 11/2010 | Ichikawa et al. | |

FOREIGN PATENT DOCUMENTS

WO    WO 2008062856 A1 *    5/2008    ............... B60L 3/00

OTHER PUBLICATIONS

International Search Report and Written Opinion of the International Searching Authority regarding PCT Application PCT/US2010/056269.
State Intellectual Property Office of P.R.C., Office Action Search Report for CN201080045724.8, mailed Mar. 5, 2014.

* cited by examiner

*Primary Examiner* — Richard V Muralidar
*Assistant Examiner* — David Henze-Gongola
(74) *Attorney, Agent, or Firm* — Womble, Carlyle, Sandridge & Rice

(57) ABSTRACT

A method for operating a battery system having multiple battery packs. The method includes decoupling the output of a discharged battery pack from the vehicle load, reducing the voltage between an output of a charged battery pack and the vehicle load prior to coupling the output of the charged battery pack to the vehicle load.

21 Claims, 7 Drawing Sheets

INTERLOCK MECHANISM FOR A MULTIPLE BATTERY PACK

CROSS-REFERENCE TO RELATED APPLICATIONS

This application claims priority to, and hereby incorporates by reference, U.S. Provisional Application No. 61/260,393, filed Nov. 11, 2009 and entitled "Interlock Mechanism for a Multiple Battery Pack."

TECHNICAL FIELD

The present invention relates to battery systems.

BACKGROUND

For electrical equipment that uses batteries and requires high power, such as electric or hybrid vehicles, the battery system will often contain multiple battery packs, only one of which will be powering the system at any time. The battery system therefore needs be able to switch from one pack to another in a manner that protects the battery packs and contactors, especially while the vehicle is in operation. Conventional systems with multiple packs generally switch to a different pack by shutting the load off completely regardless of the state of the operation and waiting for a long period to switch over. This can result in potentially dangerous problems including long switchover times that disable the vehicle operation for a long duration or switch over while the vehicle is midst of acceleration.

An example of a battery system for an electric vehicle with N battery packs is shown in FIG. 1, where N is 2 or greater. In this system, only one of the battery packs is connected to the vehicle load at a time. When the charge in battery pack 1 is exhausted, the system may switch to the next battery pack with available charge.

BRIEF DESCRIPTION OF THE DRAWINGS

The present invention is illustrated by way of example, and not limitation, in the figures of the accompanying drawings and in which like reference numerals refer to similar elements and in which.

DETAILED DESCRIPTION

In various embodiments disclosed herein, a pre-charge device and contactor test device are used to reduce the delay to switch between battery packs in a multiple battery pack system compared to delays required in prior-art techniques. The reduction in switchover delay provides many significant benefits, including, for example, improved electric/hybrid vehicle drivability and safety as an interruption in power during a critical time period is less likely. Moreover, battery life is improved because a) multiple battery packs are prevented from being connected at the same time, and b) the intrinsic capacitance of the vehicle load is prevented from becoming discharged, both of which could cause excessive current flow and damage to the battery system. While the foregoing benefits apply particularly to electric/hybrid vehicles, any system or apparatus which requires switchover between battery packs may benefit from the techniques described herein.

Figure 1:
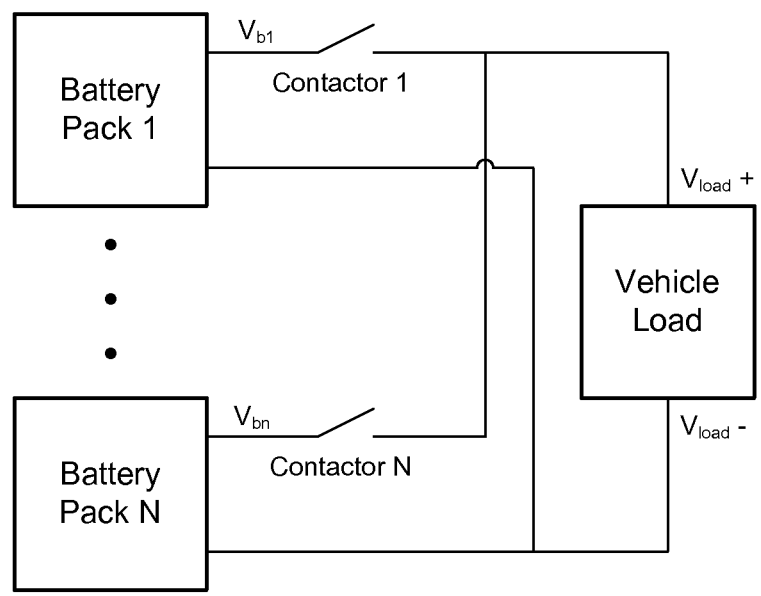
FIG. 1 illustrates an exemplary diagram of an existing multiple battery pack system.
Figure 2A:
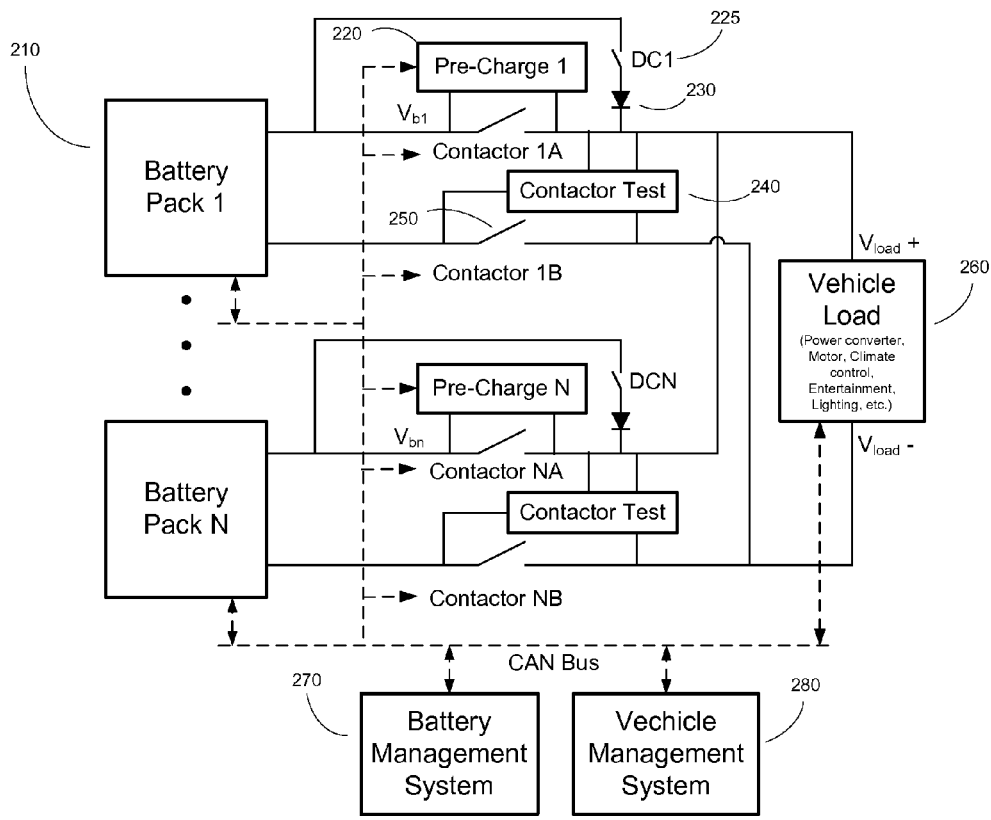
FIG. 2A illustrates an exemplary diagram of a multiple battery pack system with reduced battery pack switchover delays.
Figure 2B:
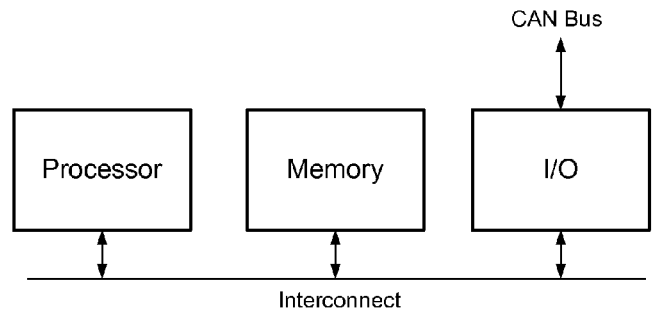
FIG. 2B shows an exemplary system diagram for a battery management system.

FIG. 2A illustrates one embodiment of a battery pack system with contactor test 240 and pre-charge 220 devices to reduce the time taken to switch between battery packs. The system is controlled by a battery management system (BMS) 270. The vehicle management system (VMS) 280 communicates with the BMS via a controller-area network (CAN) bus and monitors and/or controls the vehicle load 260. The BMS, shown in FIG. 2B, includes a processor, memory, and I/O block coupled together with an interconnect bus. The BMS is capable of executing the sequences of operations disclosed herein. One embodiment of the pre-charge device is a resistor with a relay that is controlled by the BMS. The resistance is calculated to a) allow current flow that can charge the intrinsic capacitance of the vehicle load 260 within a desired time limit, and; b) limit the current flow from the battery pack 210 below a maximum limit. An alternative embodiment of the pre-charge device could be a current source. The contactor test device 240 is used to determine if one or both of the contactors connected to a battery pack are either open or closed. In one embodiment, this information is used to prevent multiple battery packs being connected to the vehicle load at the same time. The diode 230 and diode contactor 225 are used to allow the depleted battery pack to provide a low level of power during the pre-charge period of switching between battery packs. A contactor may be any type of switching element including, for example and without limitation, a relay (or any other mechanical switch), a semiconductor device, or an electrically-isolating switching element.

Figure 3:
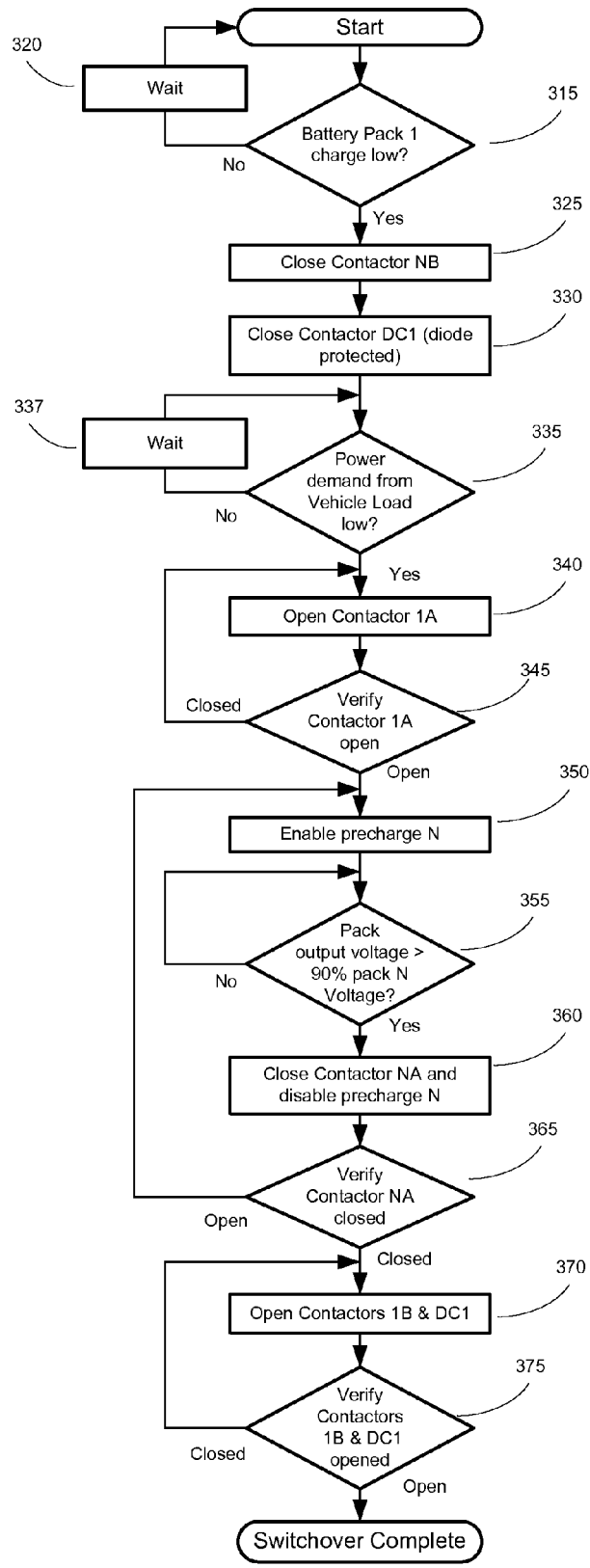
FIG. 3 illustrates an exemplary sequence of operations to switch between battery packs in a multiple battery pack system.
Figure 6:
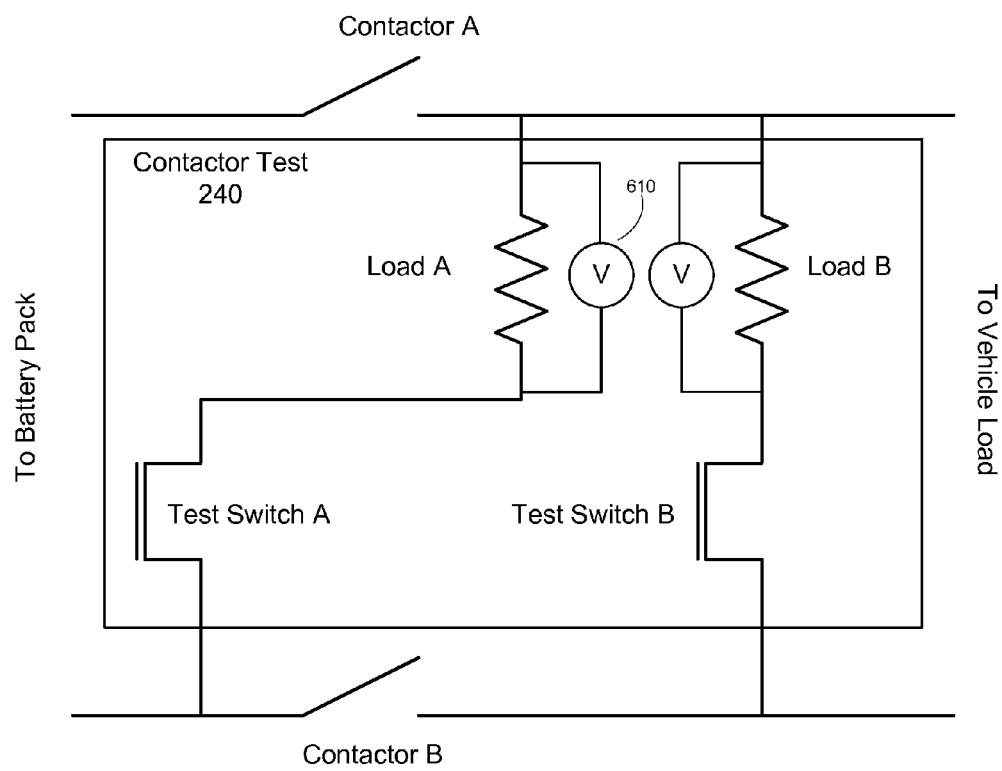
FIG. 6 illustrates an exemplary circuit to determine if contactors are in a closed or open state.

FIG. 3 illustrates an exemplary sequence of operations used to switch between battery packs in a multiple battery pack system. At step 315 the process waits until the charge in the current battery pack (in this example pack 1) becomes sufficiently low that a pack switchover is required. At step 325 contactor NB (from FIG. 2A) is closed to connect the negative terminals of the two battery packs. The diode protected positive contactor DC1 is closed on the battery pack currently in use in step 330. This allows current to continue flowing from the depleted battery pack but prevents any reverse current. At 335 the BMS monitors the vehicle power demand, and when it drops below a threshold (programmable based on the characteristics of the contactors and other factors), it opens Contactor 1A in step 340. This will cause the power draw to immediately switch to Contactor DC1 225 (through the diode). Next in 345, the contactor test device 240 is used to determine if Contactor 1A has opened successfully. One embodiment of the contactor test device is shown in FIG. 6 described below.

At step 350 the vehicle is completely operating from power supplied through Contactor DC1 which prevents any current from flowing into the Battery 1 through diode D1. The pre-charge for the next battery pack to be used (in this case pack N) is enabled to allow current to flow. This will allow the pack voltage to increase until it reaches the voltage of battery pack N.

As long as the vehicle continues to draw a lower level of power the pre-charge will be successful; however, if the vehicle starts drawing more power than the pre-charge circuit can accommodate, the pre-charge will be reset and the vehicle will return to operation using battery pack 1. Different embodiments may have different pre-charge circuits that are capable of operating at different (higher or lower) levels of power drawn by the vehicle. This sequence will continue until the vehicle remains in a low power state long enough to fully pre-charge the pack to the pre-charge level of pack N (see FIG. 4, described below). When the pre-charge level of pack N reaches a predetermined threshold (which may be stored in a plurality of programmable registers in the BMS) in step 355, in this example defined as when the voltage at $V_{load}+$ reaches 90% of the battery pack N voltage (although other methods could be used to determine successful pre-charge), contactor NA is closed and the pre-charge for battery pack N is disabled in step 360, allowing the pack to draw full power from pack N. The contactor test device is again used to determine if contactor NA has actually closed in step 365. If contactor NA is determined to not be closed, then the sequence continues back to step 350 to repeat the pre-charge and contactor closing operations. The diode D1 prevents energy from flowing from pack N into pack 1. Next in step 370 contactors 1B and DC1 are opened. The state of contactors 1B and DC1 state is verified, again using a contactor test device, in step 375. If both contactors are verified (or confirmed) to be open, the vehicle is then completely switched from battery pack 1 to battery pack N. Otherwise, the sequence loops back to attempt to open the contactors again.

Figure 4:
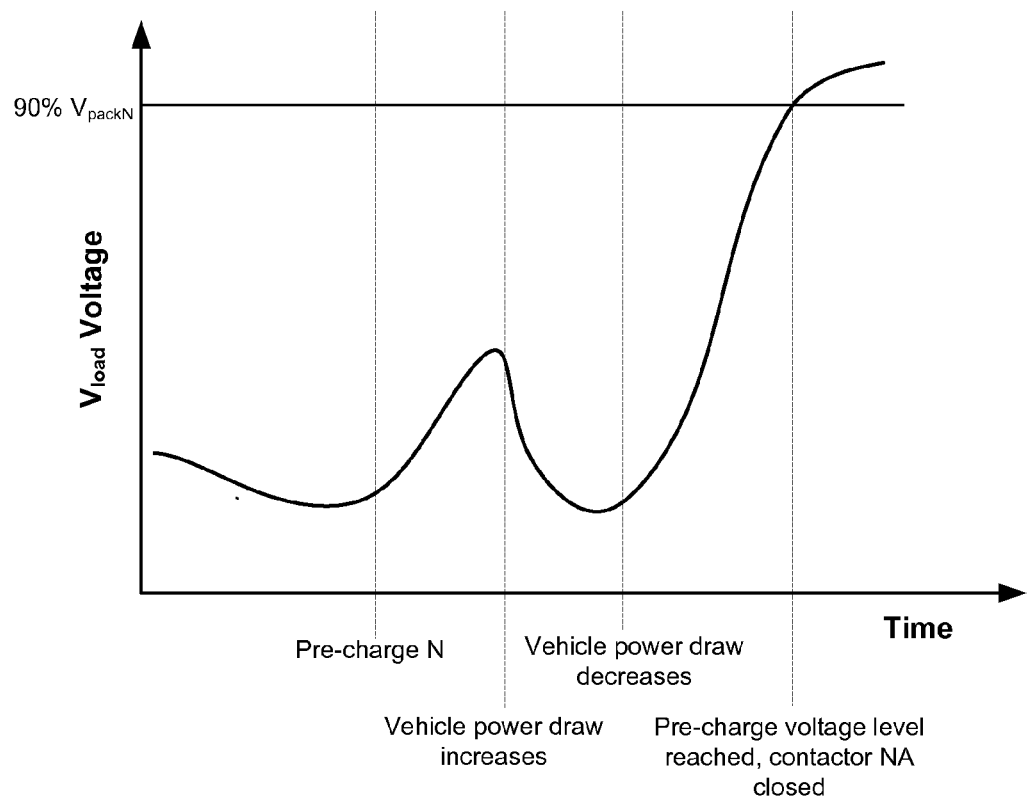
FIG. 4 illustrates an exemplary graph of the relationship between voltage and time during a battery pack switch over.

FIG. 4 is a graph of the changing voltage across the vehicle load 260 as the switchover process progresses, as well as the effect of increasing the vehicle load during the pre-charge process. In the example shown, the connection to battery pack N completed when the $V_{load}$ voltage reaches the predetermined threshold, in this example 90% of the battery pack N voltage.

Figure 5A:
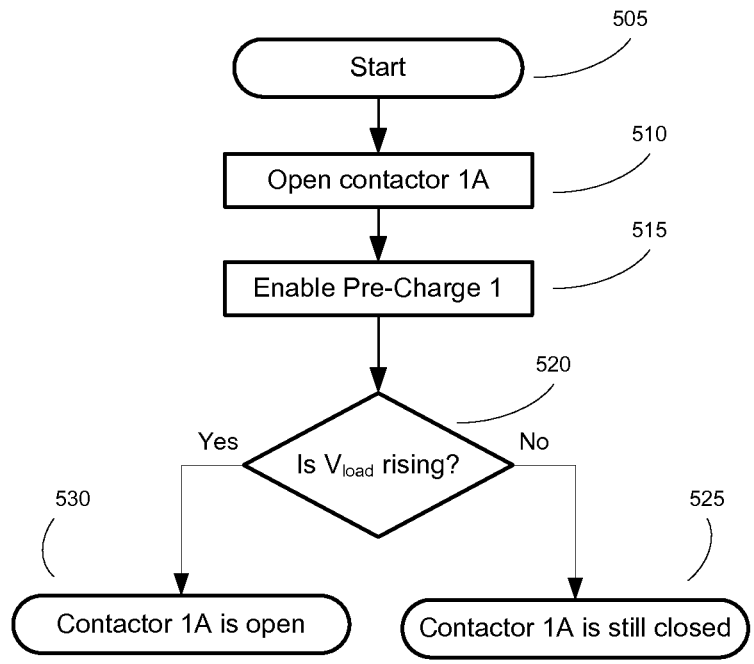
FIGS. 5A, 5B illustrate exemplary sequences of operations to determine if contactors are in a closed or open state.
Figure 5B:
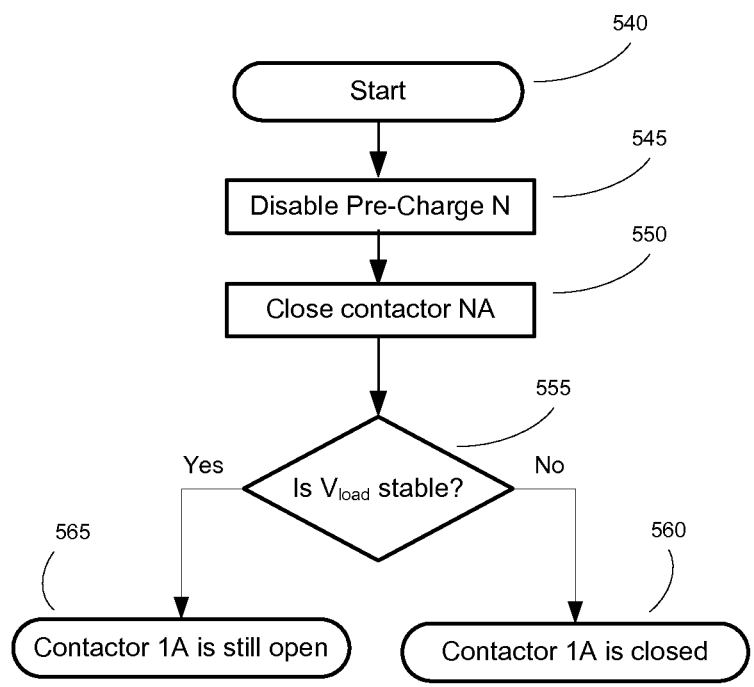

FIGS. 5A and 5B provide some exemplary sequences of steps to determine (or confirm or verify) if a contactor is open or closed. Referring to FIG. 5A, beginning at step 505. First the contactor (in this case 1A) is opened. Next the pre-charge for that contactor is enabled in step 515. If the voltage across the vehicle load ($V_{load}$) rises as checked in step 520, then it may be inferred that the contactor is open as the depleted battery pack would otherwise hold the voltage low against the pre-charge. This inference may be taken as a confirmation or verification for the purposes of battery pack switchover. Similarly a confirmation or verification that a contactor has been closed can be performed as shown in FIG. 5B. First the pre-charge is disabled in step 545. Then the contactor (in this example contactor NA) is closed in step 550. Next $V_{load}$ is measured over time (as the load changes) and evaluated for stability in step 555. If the $V_{load}$ is stable, then the contactor is closed and the charged battery is providing power to the system.

FIG. 6 shows one embodiment of a circuit that detects whether contactors are in an open or closed state. The circuit consists of load A and load B, test switch A and test switch B and voltage sensors 510 to temporarily connect a load between the two terminals of the battery pack and detect current flowing through the load. One embodiment may use resistors for loads and MOSFETs for switches although other components with similar capabilities could be used.

Figure 7:
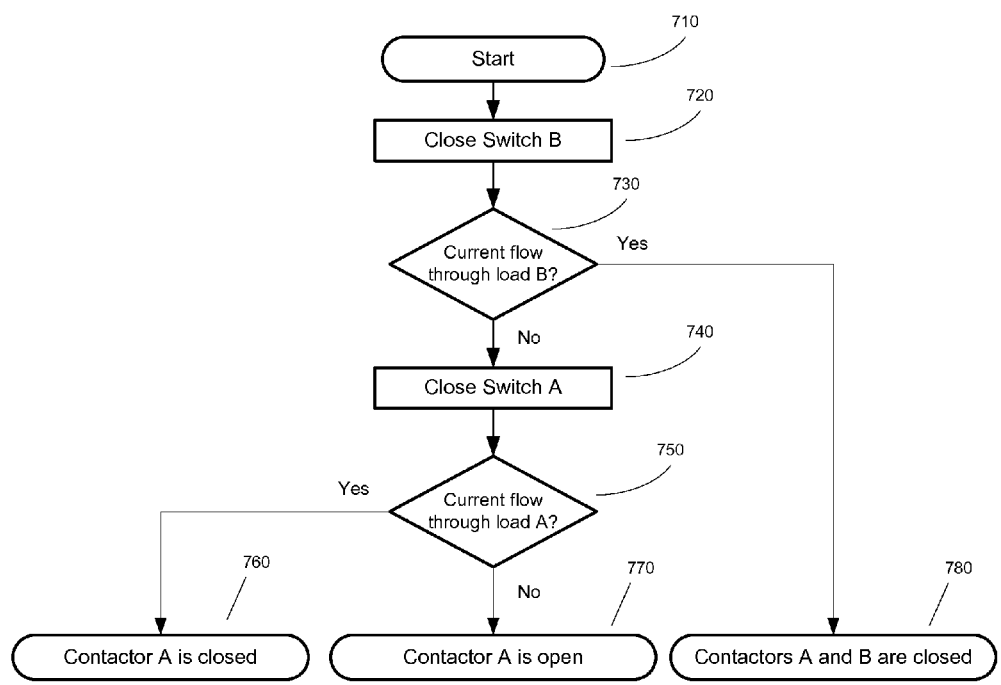
FIG. 7 illustrates a further exemplary sequence of operations to determine if contactors are in a closed or open state.

FIG. 7 illustrates an exemplary sequence of operations that may be used to determine whether contactors are closed and thus implement contactor test 240. Referring to both FIG. 6 and FIG. 7, the sequence begins by closing test switch B in operation 720. If voltage sensor 510 indicates that current is flowing through load B (i.e., a voltage drop greater than a predetermined or programmable threshold is detected), then it may be inferred that both contactors A and B are closed as no current would flow from the battery pack if both contactors A and B were open. Conversely, if voltage sensor 510 indicates that no or negligible current is flowing through load B, then processing continues with step 740 where test switch A is closed. If current then flows through load A as checked in step 750, then contactor A is closed. Otherwise contactor A is open.

The embodiments described herein may be applied to any type of device that can store energy, rechargeable or non-rechargeable, including, but not limited to, alkaline, lithium-ion, nickel-cadmium, lead-acid, flow and atomic batteries, fuel cells, and capacitors.

In the foregoing description and in the accompanying drawings, specific terminology and drawing symbols have been set forth to provide a thorough understanding of the present invention. In some instances, the terminology and symbols may imply specific details that are not required to practice the invention. For example, the term "coupled" is used herein to express a direct connection as well as a connection through one or more intervening circuits or structures. Device or system "programming" may include, for example and without limitation, loading a control value into a register, one-time programmable-circuit (e.g., blowing fuses within a configuration circuit during device production) or other storage circuit within an integrated circuit device of the host system (or host device) and thereby control an operational aspect of the host system or establish a host system configuration. The terms "exemplary" and "embodiment" are used to express an example, not a preference or requirement. Signal paths that appear as single conductors may include multiple conductors and vice-versa, and components shown as being included within or forming part of other components may instead be disposed separately from such other components. With regard to flow diagrams and the like, the order of operations may be different from those shown and, where practical, depicted operations may be omitted and/or further operations added.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation in a battery system having multiple battery packs, the method comprising:
   decoupling an output of a first battery pack from a first load terminal;
   reducing a voltage between an output of a second battery pack and the first load terminal prior to coupling the output of the second battery pack to the first load terminal;
   coupling the output of the second battery pack to the first load terminal via a switch, in response to determining that the voltage has been reduced below a predetermined threshold;

coupling a load between the first load terminal and a further output of the second battery pack, wherein a current flowing through the load detects the switch is closed irrespective of whether the further output of the second battery pack is coupled to or decoupled from a second load terminal; and sensing whether current is flowing through the load.

2. The method of claim 1 wherein decoupling an output of a first battery pack from the first load terminal comprises:
changing the state of a switch-control signal to open a switching element disposed between the first battery pack and the first load terminal; and
confirming that the switching element has opened in response to changing the state of the switch-control signal.

3. The method of claim 2 wherein confirming that the switching element has opened includes, at least in part, measuring current flowing through an electrical load temporarily coupling the first load terminal and a second load terminal.

4. The method of claim 1 wherein reducing the voltage between the output of a second battery pack and the first load terminal includes, at least in part, establishing a coupling between the output of a second battery pack and the first load terminal enabling a limited current to flow between the output of the second battery pack and the first load terminal.

5. The method of claim 4 wherein enabling a limited current to flow comprises switchably coupling a resistive load between the output of the second battery pack and the first load terminal.

6. The method of claim 1 wherein determining that the voltage has been reduced to a level below a predetermined threshold comprises measuring a voltage across a switching element disposed between the first load terminal and the output of the second battery pack.

7. The method of claim 1 wherein coupling an output of the second battery pack to the first load terminal comprises:
changing the state of a switch-control signal to close a switching element disposed between the second battery pack and the first load terminal; and
confirming that the switching element has closed in response to changing the state of the switch-control signal.

8. The method of claim 7 further comprising measuring a voltage across the switching element to confirm that the output of the first battery pack has been decoupled from the first load terminal.

9. The method of claim 1 further comprising changing the state of a switch-control signal to close a switching element that couples a unidirectional conduction path for current flow disposed between the output of the second battery pack and the first load terminal.

10. A battery management system comprising:
a first switching element to decouple an output of a first battery pack from a first load terminal;
a pre-charging circuit to reduce a voltage between an output of a second battery pack and the first load terminal prior to coupling the output of the second battery pack to the first load terminal;
a second switching element to couple the output of the second battery pack to the first load terminal in response to determining that the voltage has been reduced to a level below a predetermined threshold; and
a third switching element to couple a load between the first load terminal and a further output of the second battery pack, wherein a current flowing through the load indicates the second switching element is closed regardless of whether the further output of the second battery pack is coupled to or decoupled from a second load terminal.

11. The battery management system of claim 10 wherein the first switching element comprises:
a first circuit to change the state of a switch-control signal to open the first switching element disposed between the first battery pack and the first load terminal; and
a second circuit to confirm that the first switching element has opened in response to changing the state of the switch-control signal.

12. The battery management system of claim 11 wherein confirming that the first switching element has opened includes, at least in part, measuring current flowing through an electrical load temporarily coupling the first load terminal and a second load terminal.

13. The battery management system of claim 10 wherein the pre-charging circuit includes a coupling that limits the current flow between the output of a second battery pack and the first load terminal.

14. The battery management system of claim 13 wherein the coupling that limits the current flow comprises a resistor and a relay.

15. The battery management system of claim 10 wherein the circuitry to determine that the voltage has been reduced to a level below a predetermined threshold comprises a voltage measuring device disposed between the first load terminal and the output of the second battery pack.

16. The battery management system of claim 10 wherein the second switching element comprises:
a first circuit to change the state of a switch-control signal to close the second switching element disposed between the second battery pack and the first load terminal; and
a second circuit that confirms that the second switching element has closed in response to changing the state of the switch-control signal.

17. The battery management system of claim 16 wherein the circuitry to measure the voltage across the second switching element comprises a voltage measuring device disposed between the first load terminal and the output of the first battery pack.

18. The battery management system of claim 10 further comprising circuitry to enable a unidirectional current conduction path from the output of the second battery pack to the first load terminal.

19. The battery management system of claim 18 wherein the circuitry to enable a unidirectional current conduction path comprises a diode.

20. The battery management system of claim 10 wherein the first load terminal is coupled to an electric motor of a passenger-transport vehicle.

21. An apparatus comprising:
means for decoupling an output of a first battery pack from a first load terminal;
means for reducing a voltage between an output of a second battery pack and the first load terminal prior to coupling the output of the second battery pack to the first load terminal;
means for coupling the output of the second battery pack to the first load terminal in response to determining that the voltage has been reduced below a predetermined threshold; and
means for coupling an electrical load from the first load terminal to a further output of the second battery pack and detecting a current flowing through the load so as to determine whether the output of the second battery pack is coupled to the first load terminal regardless of whether the further output of the second battery pack is coupled to or decoupled from a second load terminal, and determine whether the output of the second battery pack is decoupled from the first load terminal regardless of whether the further output of the second battery pack is coupled to or decoupled from the second load terminal.

* * * * *